(12) United States Patent
Onozuka et al.

(10) Patent No.: US 11,099,061 B2
(45) Date of Patent: Aug. 24, 2021

(54) MEASUREMENT DEVICE FOR LIGHT-EMITTING DEVICE AND METHOD FOR MEASURING LIGHT-EMITTING DEVICE

(71) Applicant: NICHIA CORPORATION, Anan (JP)

(72) Inventors: Katsuyuki Onozuka, Nagano (JP); Minoru Kitahara, Chino (JP); Naohide Miyasaka, Suwa (JP); Naoki Nakamura, Suwa-gun (JP); Takanori Aruga, Suwa-gun (JP); Shinobu Ito, Iwata (JP)

(73) Assignee: NICHIA CORPORATION, Anan (JP)

(*) Notice: Subject to any disclaimer, the term of this patent is extended or adjusted under 35 U.S.C. 154(b) by 206 days.

(21) Appl. No.: 16/436,830

(22) Filed: Jun. 10, 2019

(65) Prior Publication Data

US 2019/0376842 A1    Dec. 12, 2019

(30) Foreign Application Priority Data

Jun. 11, 2018  (JP) .............................. JP2018-110847

(51) Int. Cl.
*G01J 1/04* (2006.01)
*G01J 1/44* (2006.01)

(52) U.S. Cl.
CPC ............... *G01J 1/0418* (2013.01); *G01J 1/44* (2013.01); *G01J 2001/4406* (2013.01)

(58) Field of Classification Search
CPC .......... G01J 1/0403; G01J 1/0418; G01J 1/44; G01J 2001/0481; G01J 2001/4406
See application file for complete search history.

(56) References Cited

U.S. PATENT DOCUMENTS

| | | | |
|---|---|---|---|
| 5,098,195 A | 3/1992 | Halyo et al. | |
| 5,258,363 A * | 11/1993 | Hed | G01J 1/04 250/228 |
| 8,259,294 B2 | 9/2012 | Proehl et al. | |
| 2003/0133101 A1 | 7/2003 | Kubo | |

FOREIGN PATENT DOCUMENTS

| | | |
|---|---|---|
| JP | 2-150727 | 6/1990 |
| JP | 2000-501182 | 2/2000 |
| JP | 2001-272272 | 10/2001 |
| JP | 2014-074628 | 4/2014 |
| WO | WO 97/20192 | 6/1997 |

* cited by examiner

*Primary Examiner* — Kevin K Pyo
(74) *Attorney, Agent, or Firm* — Mori & Ward, LLP (57) ABSTRACT

A measurement device for a light-emitting device includes a light attenuator, a photometric sphere, and a light detector. The light attenuator includes a first surface and a heat dissipator. A first light that is emitted from the first light-emitting device is incident on the first surface. The first surface is configured to absorb a portion of the first light. The heat dissipator is configured to dissipate heat of the first surface. The photometric sphere has an inner surface to reflect the first light reflected by the first surface. The light detector is configured to receive at least a portion of the first light reflected by the inner surface.

20 Claims, 6 Drawing Sheets

MEASUREMENT DEVICE FOR LIGHT-EMITTING DEVICE AND METHOD FOR MEASURING LIGHT-EMITTING DEVICE

CROSS-REFERENCE TO RELATED APPLICATIONS

This application is based upon and claims the benefit of priority from Japanese Patent Application No. 2018-110847, filed on Jun. 11, 2018; the entire contents of which are incorporated herein by reference.

BACKGROUND OF THE INVENTION

Field

Embodiments described herein relate to a measurement device for a light-emitting device and a method for measuring the light-emitting device.

Background

A photometric sphere or the like is used to measure the characteristics of a light-emitting device. A measurement device of the light-emitting device is desirable in which the measurement time can be shortened, for example, Japanese Patent Publication No. 2014-74628.

SUMMARY

According to an embodiment, a measurement device for a light-emitting device includes a light attenuator, a photometric sphere, and a light detector. The light attenuator includes a first surface and a heat dissipator. A first light that is emitted from the first light-emitting device is incident on the first surface. The first surface is configured to absorb a portion of the first light. The heat dissipator is configured to dissipate heat of the first surface. The photometric sphere has an inner surface to reflect the first light reflected by the first surface. The light detector is configured to receive at least a portion of the first light reflected by the inner surface.

According to another embodiment, a method for measuring a light-emitting device includes controlling a first light-emitting device to emit a first light to be incident on a first surface of a light attenuator to cause the first surface to absorb a portion of the first light. The light attenuator includes the first surface and a heat dissipator dissipating heat of the first surface. The method for measuring includes detecting at least a portion of the first light reflected by an inner surface of a photometric sphere after being reflected by the first surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF DESCRIPTION

The embodiments will now be described with reference to the accompanying drawings, wherein like reference numerals designate corresponding or identical elements throughout the various drawings.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1:
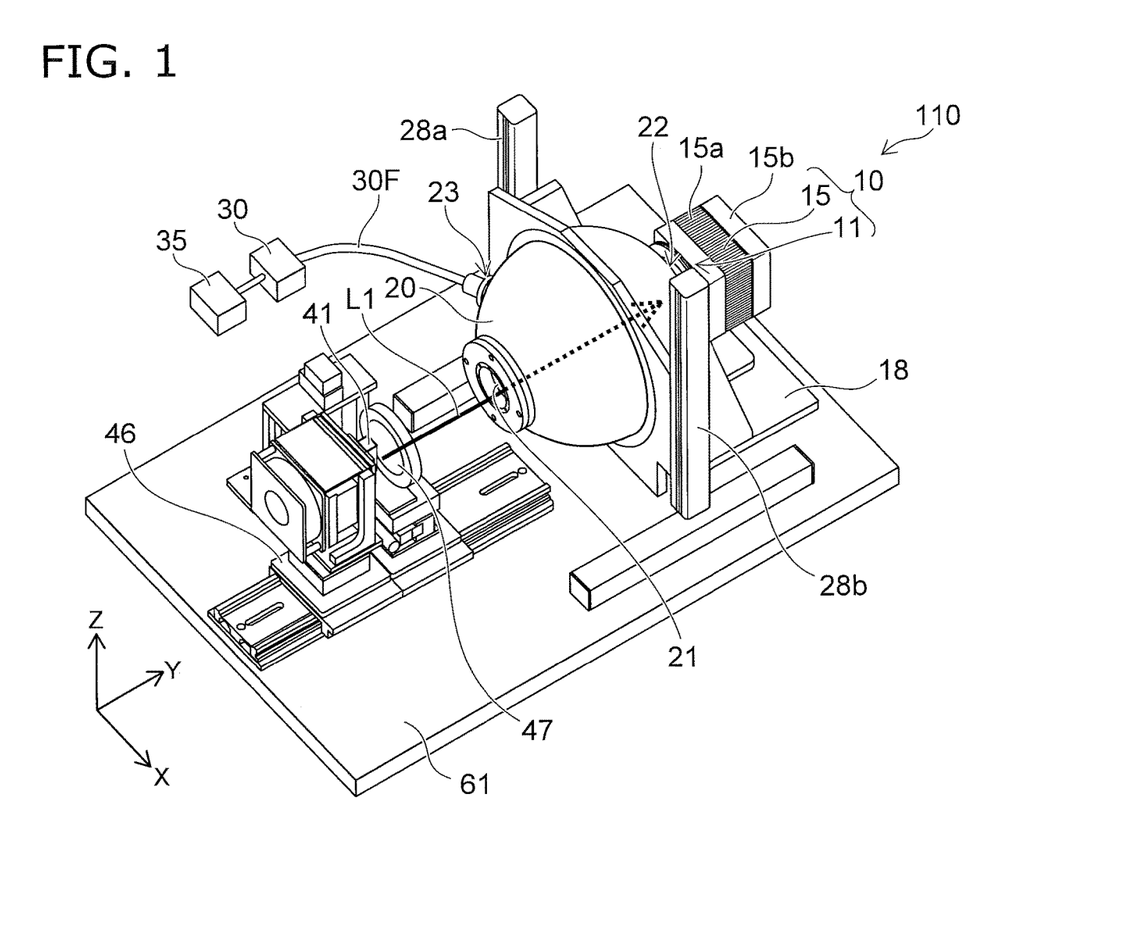
FIG. 1 is a schematic view illustrating a measurement device of a light-emitting device according to a first embodiment.
Figure 2:
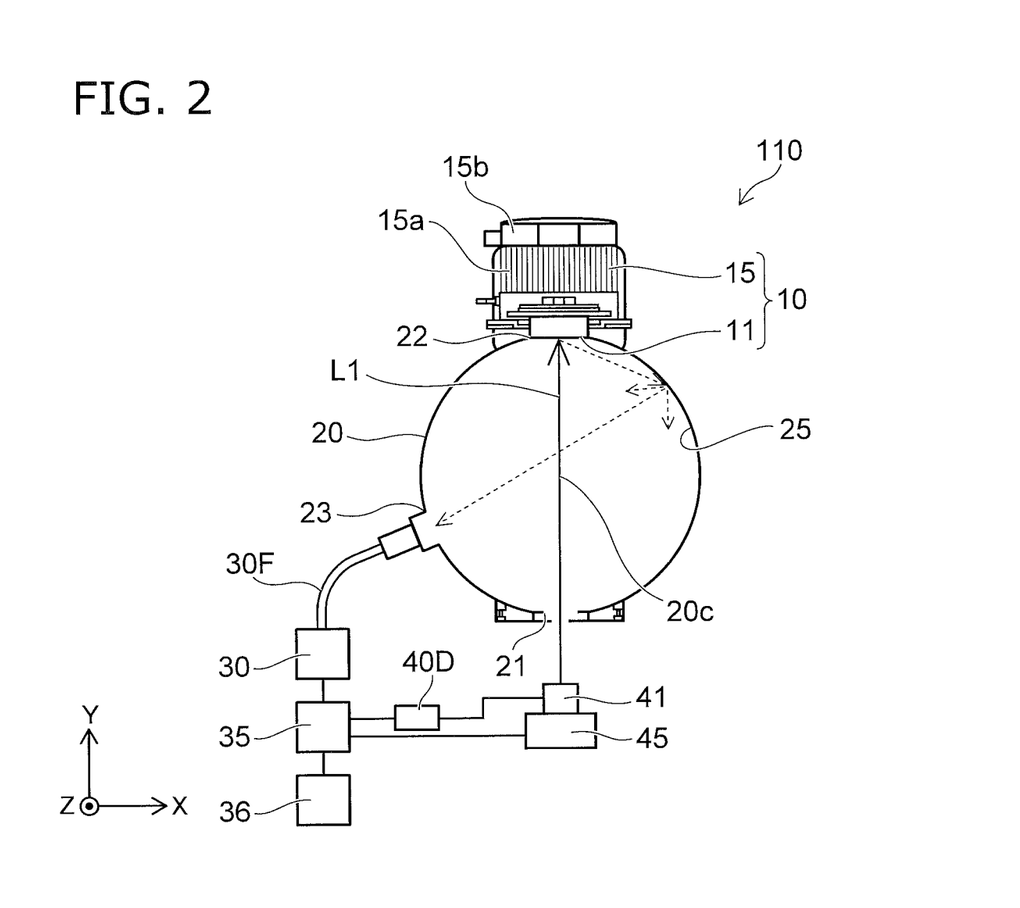
FIG. 2 is a schematic view illustrating the measurement device of the light-emitting device according to the first embodiment.

FIG. 1 and FIG. 2 are schematic views illustrating a measurement device of a light-emitting device according to a first embodiment.

FIG. 1 is a perspective view. FIG. 2 is a plan view.

As shown in FIG. 1 and FIG. 2, the measurement device 110 of the light-emitting device according to the embodiment includes a light attenuator 10, a photometric sphere 20, and a light detector 30.

The measurement device 110 measures characteristics of a first light-emitting device 41. In one example, the first light-emitting device 41 is a laser. The first light-emitting device 41 may be, for example, a semiconductor laser (e.g., a LD (Laser Diode)). The first light-emitting device 41 may be an LED (Light Emitting Diode). The characteristics of a first light L1 emitted from the first light-emitting device 41 are measured by the measurement device 110. The characteristics of the first light L1 include, for example, at least one of the radiant flux or the spectrum (the wavelength characteristics) of the first light L1.

The light attenuator 10 includes a first surface 11 and a heat dissipator 15. The first light L1 that is emitted from the first light-emitting device 41 is incident on the first surface 11. The first surface 11 absorbs a portion of the first light L1. The heat dissipator 15 dissipates heat of the first surface 11. The heat dissipator 15 includes, for example, a heat dissipation fin 15*a* and a cooling portion 15*b*. The cooling portion 15*b* cools the heat dissipation fin 15*a*. For example, the cooling portion 15*b* cools the heat dissipation fin 15*a* using air cooling or liquid cooling.

The photometric sphere 20 is positioned between the first light-emitting device 41 and the light attenuator 10. The photometric sphere 20 includes a first opening 21 and a second opening 22. The first light L1 enters the first opening 21. The second opening 22 is provided at the position where the first light L1 is initially incident after being emitted from the first light-emitting device 41 and entering through the first opening 21.

In one example according to the embodiment, at least a portion of the first light-emitting device 41 may be provided inside the photometric sphere 20. In such a case as well, the second opening 22 (the opening) is provided. The second opening 22 is provided at the position of the photometric sphere 20 where the first light L1 emitted from the first light-emitting device 41 is initially incident. At least a portion of the first light-emitting device 41 may be inside the first opening 21.

For example, the direction from the first opening 21 toward the first surface 11 is taken as a first direction. The first direction is taken as a Y-axis direction. One direction perpendicular to the Y-axis direction is taken as an X-axis direction. A direction perpendicular to the Y-axis direction and the X-axis direction is taken as a Z-axis direction.

For example, the Y-axis direction corresponds to the incident direction of the first light L1 entering the first opening 21. The Z-axis direction corresponds to the height direction.

The second opening 22 is provided between the first opening 21 and the first surface 11 in the first direction (the Y-axis direction). The first light L1 that is emitted from the first light-emitting device 41 passes through the second opening 22 and is incident on the first surface 11.

The photometric sphere 20 has an inner surface 25. As described above, the first light L1 is incident on the first surface 11 of the light attenuator 10; and the first surface 11 absorbs a portion of the first light L1. The light of the first light L1 that is not absorbed by the first surface 11 is reflected by the first surface 11. The reflected first light L1 travels toward the inner surface 25 of the photometric sphere 20 and is reflected by the inner surface 25. Thus, the inner surface 25 reflects the first light L1 reflected by the first surface 11. The second opening 22 is provided between the first surface 11 of the light attenuator 10 and at least a portion of the inner surface 25.

The light detector 30 receives at least a portion of the first light L1 reflected by the inner surface 25. In the example, the photometric sphere 20 includes a third opening 23 in addition to the first opening 21 and the second opening 22. At least a portion of the first light L1 reflected by the inner surface 25 of the photometric sphere 20 passes through the third opening 23 and is incident on the light detector 30.

In one example, a second direction from the second opening 22 toward the third opening 23 crosses the first direction (the Y-axis direction) recited above. The third opening 23 is provided at a position separated from the optical axis passing through the first opening 21 and the second opening 22.

In one example, the position of the third opening 23 in the first direction (the Y-axis direction) is between the position in the first direction of a center 20*c* of the photometric sphere 20 and the position of the first opening 21 in the first direction. For example, the distance between the third opening 23 and the first opening 21 is shorter than the distance between the third opening 23 and the second opening 22.

As recited above, the light detector 30 receives at least a portion of the first light L1 passing through the third opening 23 after being reflected by the inner surface 25.

In the example, the first light L1 enters the light detector 30 via an optical fiber 30F. The light detector 30 is, for example, an optical spectrum analyzer or a spectrometer. The light detector 30 may be connected to a processor 35 (e.g., a computer, etc.). Various data (information) that is detected by the light detector 30 may be supplied to the processor 35. The light detector 30 may be controlled by the processor 35.

For example, a driver 40D may be provided as shown in FIG. 2. A current (e.g., a current pulse) is supplied to the light-emitting device (e.g., the first light-emitting device 41, etc.) from the driver 40D. The processor 35 may control the driver 40D. At least one of the magnitude of the current, the pulse width of the current, or the period of the pulse of the current supplied to the light-emitting device is controllable thereby. Information that relates to at least one of the current or the voltage of the light-emitting device may be supplied to the processor 35.

A temperature controller 45 may be provided as shown in FIG. 2. The temperature controller 45 controls the temperature of the light-emitting device (e.g., the first light-emitting device 41). The temperature controller 45 includes, for example, a Peltier device. The processor 35 may control the temperature controller 45. Thereby, the temperature of the light-emitting device may be controlled.

For example, the processor 35 may control the timing of the light emission of the light-emitting device and the photometry of the light detector 30. For example, the timing is synchronized between these components. For example, the conditions of the current of the light-emitting device and the conditions of the temperature of the light-emitting device are modified; and the light is measured at each of these multiple conditions.

A memory 36 may be provided in the embodiment. For example, the memory 36 is connected to the processor 35. The connection between the memory 36 and the processor 35 is performed by at least one of a wired or wireless method. The memory 36 may be provided in a server. The memory 36 can store the data (the information) obtained by the light detector 30. The memory 36 may store the data used in the processing performed by the processor 35. The processor 35 may read the data stored in the memory 36 and process the data obtained by the light detector 30.

In the example, a stage 46 is provided on an optical bench 61. The first light-emitting device 41 is provided on the stage 46. For example, the stage 46 has an adjustment function in the XYZ-directions. For example, the stage 46 may be controlled by the processor 35. For example, the position of the first light-emitting device 41 may be controlled by the processor 35. For example, the light-emitting operation of the first light-emitting device 41 may be controlled by the processor 35.

For example, the light attenuator 10 and the photometric sphere 20 are provided on the optical bench 61. For example, a supporter 18 is provided in the optical bench 61; and the light attenuator 10 is supported by the supporter 18. Posts 28*a* and 28*b* are provided in the optical bench 61; and the photometric sphere 20 is supported by the posts 28*a* and 28*b*. In the embodiment, a lens 47 may be provided between the first opening 21 and the light-emitting device (e.g., the first light-emitting device 41) as necessary.

In the embodiment as recited above, the first light L1 which is the measurement object is incident on the first surface 11 of the light attenuator 10; and the first surface 11 absorbs a portion of the first light L1. Then, the reflected light that is not absorbed by the first surface 11 is reflected by the inner surface 25 of the photometric sphere 20 and enters the light detector 30. Even when the power of the first light L1 is high, damage of the inner surface 25 of the photometric sphere 20 can be suppressed because the first light L1 is attenuated by the first surface 11 of the light attenuator 10. Then, because the attenuated first light L1 can be detected by the light detector 30, the spectrum can be measured with high precision. According to the embodiment, for example, stable measurements are possible.

In the embodiment, the light that is the measurement object is detected by the light detector 30. The measurement time of the light detector 30 is short. According to the embodiment, a measurement device of a light-emitting device can be provided in which the measurement time can be shortened.

There is a first reference example that uses a calorimeter for the measurement of the light-emitting device. The calorimeter measures the light from the light-emitting device by converting the light into heat and by converting the heat into, for example, an electrical signal. In the first reference example, a long period of time is necessary for the heat based on the light to stabilize. Therefore, it is difficult to measure quickly in the first reference example.

Conversely, in the embodiment, the light is detected by the light detector 30. The measurement time can be shortened thereby. Here, the light is incident on the first surface 11 of the light attenuator 10; a portion of the light is absorbed by the first surface 11; the reflected light that is not absorbed by the first surface 11 is reflected by the inner surface 25 of the photometric sphere 20 and enters the light detector 30. Thereby, even when the power of the light is high, damage of the inner surface 25 of the photometric sphere 20 can be suppressed.

For example, a second reference example may be considered in which the photometric sphere 20 in which the second opening 22 is not provided is used without using the light attenuator 10. In the second reference example, the first light L1 is directly incident on the inner surface 25 of the photometric sphere 20. Therefore, the inner surface 25 is damaged when the power of the first light L1 is high. For example, a film that includes a reflective material (e.g., barium sulfate) and a binder is provided on the inner surface 25. For example, the binder degrades when the high-power first light L1 is incident on the film. Therefore, in the second reference example, it is difficult to obtain stable reflective characteristics at the inner surface 25. In the second reference example, it is difficult to perform stable measurements.

On the other hand, a third reference example may be considered in which the heat dissipator 15 is not provided in the light attenuator 10. In such a case, the first light L1 is incident on the first surface 11 of the light attenuator 10 and is attenuated. Therefore, the damage of the inner surface 25 of the photometric sphere 20 can be suppressed. However, a portion of the first light L1 is absorbed by the first surface 11; and the temperature of the first surface 11 increases. In particular, when the power of the first light L1 is high, the temperature of the first surface 11 increases excessively; and the first surface 11 is damaged. Or, the characteristics (the reflective characteristics) of the first surface 11 change. There are also cases where the measurement precision changes when measuring for a long period of time. In the third reference example as well, it is difficult to perform stable measurements.

Conversely, in the embodiment, the heat dissipator 15 that dissipates the heat of the first surface 11 is provided in the light attenuator 10. For example, the heat dissipation fin 15a and the cooling portion 15b are provided in the heat dissipator 15. For example, the heat of the first surface 11 can be dissipated efficiently by dissipating the heat of the heat dissipation fin 15a by air cooling or liquid cooling by the cooling portion 15b. The excessive increase of the temperature of the first surface 11 can be suppressed thereby. The damage or the change of the first surface 11 can be suppressed; and stable measurements are possible.

In the embodiment, the reflectance of the first surface 11 for the first light L1 is, for example, 35% or less. The reflectance of the first surface 11 for the first light L1 may be, for example, 10% or less. The reflectance may be, for example, 6% or less. The intensity of the first light L1 reflected by the first surface 11 can be low; and the damage (and the increase of the temperature) of the inner surface 25 of the photometric sphere 20 can be suppressed effectively.

In the embodiment, the first light L1 that is emitted from the first light-emitting device 41 is, for example, a laser. Even when measuring light having a high energy density such as that of a laser, the damage of the first surface 11 and the inner surface 25 can be suppressed; and stable measurement results are obtained. The radiant flux of the first light L1 emitted from the first light-emitting device 41 is, for example, 0.1 W or more. The radiant flux of the first light L1 emitted from the first light-emitting device 41 may be, for example, 0.1 kW or more, or 0.5 kW or more. The radiant flux may be, for example, 120 kW or less. The embodiment can measure the light of any radiant flux.

The radiant emittance of the first light L1 emitted from the first light-emitting device 41 may be, for example, 1 kW/cm$^2$ or more. The radiant emittance of the first light L1 emitted from the first light-emitting device 41 may be, for example, about 10 kW/cm$^2$ or more.

In the embodiment, the light attenuator 10 may include a thermoelectric conversion portion. For example, the thermoelectric conversion portion converts the heat of a portion of the first light L1 incident on the first surface 11 into an electrical signal. The energy of the first light L1 incident on the first surface 11 can be measured based on the electrical signal. For example, the light attenuator 10 may function as a calorimeter. The light attenuator 10 is, for example, a calorimeter.

In the case where the energy of the first light L1 incident on the first surface 11 can be measured by the light attenuator 10, the radiant flux of the first light L1 may be measured by the light attenuator 10. In such a case, as described below, the radiant flux and the spectrum of the first light L1 can be measured stably with high precision by the measurement device 110.

For example, the radiant flux when the first light-emitting device 41 is emitting light at one condition (e.g., a reference condition) is measured by the light attenuator 10; and the measured value of the light detector 30 is corrected using this result. A correction example will now be described.

Figure 3A:
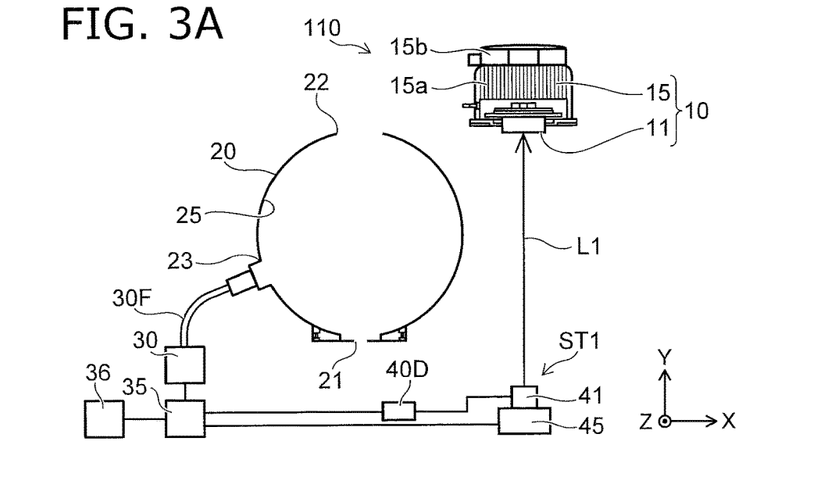
FIG. 3A is a schematic plan view illustrating the measurement device of the light-emitting device according to the first embodiment.
Figure 3B:
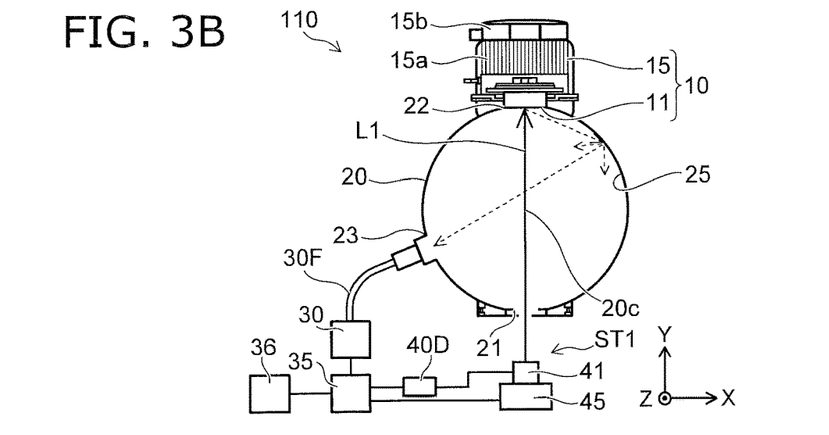
FIG. 3B is a schematic plan view illustrating the measurement device of the light-emitting device according to the first embodiment.
Figure 3C:
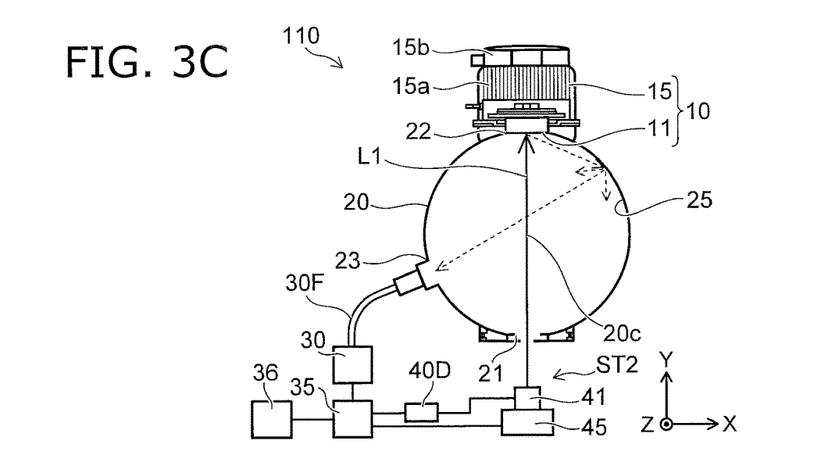
FIG. 3C is a schematic plan view illustrating the measurement device of the light-emitting device according to the first embodiment.

FIG. 3A to FIG. 3C are schematic plan views illustrating the measurement device of the light-emitting device according to the first embodiment.

In FIG. 3A and FIG. 3B, the first light-emitting device 41 emits light at a first condition ST1. In FIG. 3C, the first light-emitting device 41 emits light at a second condition ST2 different from the first condition ST1. As described below, the driving conditions, the temperature, etc., of the light-emitting device are different between the first condition ST1 and the second condition ST2.

As shown in FIG. 3A and FIG. 3B, for example, the positions of the photometric sphere 20 and the light attenuator 10 are relatively modifiable in the measurement device 110. In FIG. 3A, the photometric sphere 20 is shifted in the X-axis direction compared to the state illustrated in FIG. 3B. For example, the relative positional relationship between the photometric sphere 20, the optical fiber 30F, and the light detector 30 is substantially not modified. For example, the positional relationship between the first light-emitting device 41 and the first surface 11 in FIG. 3A is the same as the positional relationship between the first light-emitting device 41 and the first surface 11 in FIG. 3B. In FIG. 3A, the light can be incident on the first surface 11 of the light attenuator 10 without passing through the photometric sphere 20.

As shown in FIG. 3A, the first light L1 that is emitted from the first light-emitting device 41 at the first condition ST1 is incident on the first surface 11 without passing through the photometric sphere 20. The light attenuator 10 can acquire the first radiant flux of the first light L1. In such a case, the light attenuator 10 functions as a calorimeter.

As shown in FIG. 3B, the first light L1 that is emitted from the first light-emitting device 41 at the first condition ST1 recited above passes through the photometric sphere 20, is reflected by the first surface 11, is reflected by the inner surface 25, and enters the light detector 30. The light detector 30 can acquire the second radiant flux of the first light L1.

As shown in FIG. 3C, the first light L1 that is emitted from the first light-emitting device 41 at the second condition ST2 passes through the photometric sphere 20, is reflected by the first surface 11, is reflected by the inner surface 25, and enters the light detector 30. The light detector 30 can acquire the third radiant flux of the first light L1.

For example, the second and third radiant fluxes recited above are obtained based on results using spectral sensitivity coefficients to correct the measured values corresponding respectively to the multiple wavelengths obtained by the light detector 30 and by integrating the values after correcting. For example, the spectral sensitivity correction values can be determined based on the characteristics of a standard light source.

The first radiant flux recited above is taken as E1; the second radiant flux recited above is taken as E2; and the third radiant flux recited above is taken as E3. The processor 35 can output a first value corresponding to E3×(E1/E2).

"E1/E2" that relates to the first condition ST1 corresponds to a correction coefficient between the value obtained by the light attenuator 10 and the value obtained by the light detector 30. By using the value relating to the first condition ST1, the value obtained by the light detector 30 at any condition (the second condition ST2) can be corrected.

For example, the measurement time of the light attenuator 10 is relatively long. On the other hand, the measurement time of the light detector 30 is relatively short. By obtaining the measurement results (the first radiant flux and the second radiant flux) using the light attenuator 10 and the light detector 30 at the first condition ST1, a measurement at any condition (the second condition) can be performed in a short period of time with high precision by measuring using the light detector 30 which has a short measurement time.

The second condition ST2 recited above includes at least one of the second current (the magnitude of the current) recited below, the second current pulse width recited below, the second current pulse period recited below, or the second temperature recited below. The second current (the magnitude of the current) is different from the first current (the magnitude of the current) supplied to the first light-emitting device 41 at the first condition ST1. The second current pulse width (the time of the current pulse) is different from the first current pulse width supplied to the first light-emitting device 41 at the first condition ST1. The second current pulse period is different from the first current pulse period supplied to the first light-emitting device 41 at the first condition ST1. The second temperature is different from the first temperature of the first light-emitting device 41 at the first condition ST1.

In the case where the light attenuator 10 can measure the radiant flux, the calibration of the measurement system may be performed using a reference light-emitting device (e.g., a reference LD). Thereby, stable and high-precision measurements are easier. An example of the calibration (or the correction) will now be described.

Figure 4:
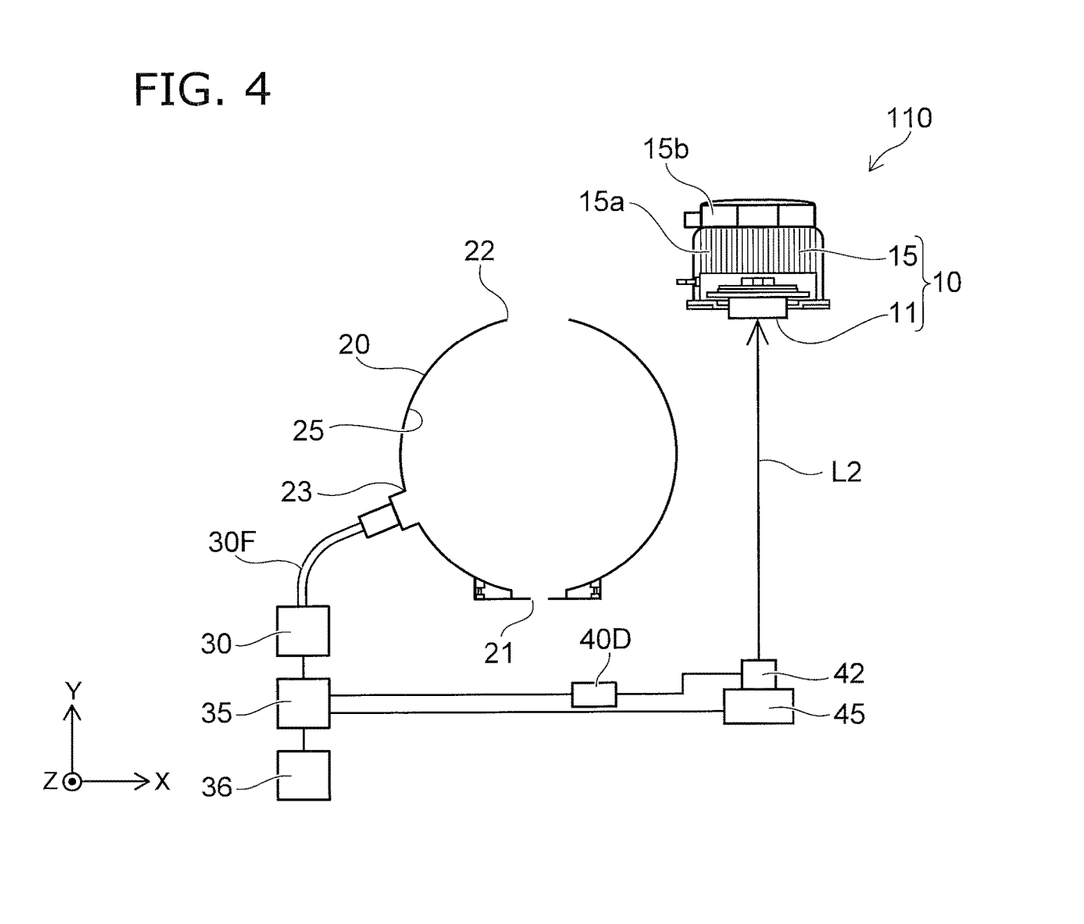
FIG. 4 is a schematic plan view illustrating the measurement device of the light-emitting device according to the first embodiment.
Figure 5:
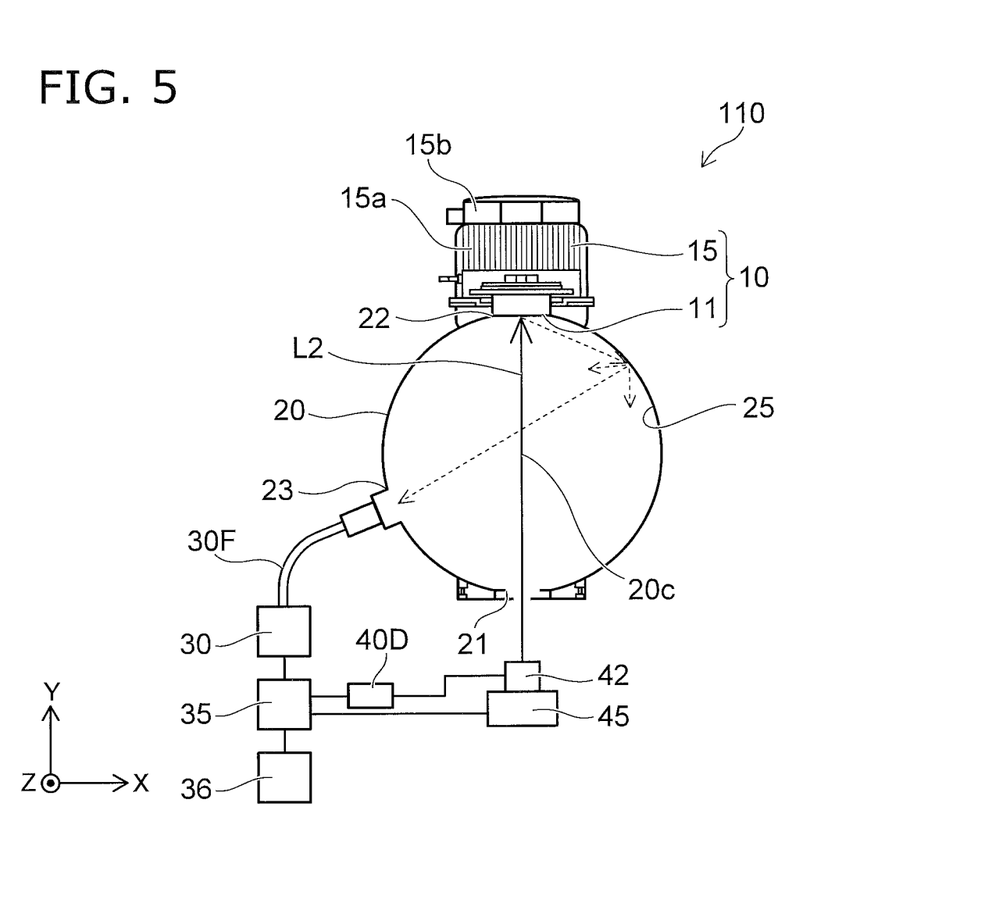
FIG. 5 is a schematic plan view illustrating the measurement device of the light-emitting device according to the first embodiment.

FIG. 4 and FIG. 5 are schematic plan views illustrating the measurement device of the light-emitting device according to the first embodiment.

In FIG. 4 and FIG. 5, the characteristics of a second light-emitting device 42 are measured as the reference light-emitting device. As shown in FIG. 4, for example, the positions of the photometric sphere 20 and the light attenuator 10 are relatively modifiable in the measurement device 110. In FIG. 4, the photometric sphere 20 is shifted in the X-axis direction compared to the state illustrated in FIG. 2. For example, the relative positional relationship between the photometric sphere 20, the optical fiber 30F, and the light detector 30 is substantially not modified. For example, the positional relationship between the second light-emitting device 42 and the first surface 11 in FIG. 4 is the same as the positional relationship between the first light-emitting device 41 and the first surface 11 in FIG. 2. In such a case, the light can be incident on the first surface 11 of the light attenuator 10 without passing through the photometric sphere 20.

As shown in FIG. 4, a second light L2 that is emitted from the second light-emitting device 42 is incident on the first surface 11 without passing through the photometric sphere 20. The light attenuator 10 can acquire the first radiant flux of the second light L2. For example, the second light-emitting device 42 is a light-emitting device used as the reference.

As shown in FIG. 5, the position of the photometric sphere 20 is returned to the state of FIG. 2. Thereby, the light detector 30 can acquire the second radiant flux of the second light L2 that is emitted from the second light-emitting device 42, passes through the photometric sphere 20, is reflected by the first surface 11, is reflected by the inner surface 25, and enters the light detector 30.

Thus, values that correspond to the radiant fluxes (the first radiant flux and the second radiant flux) can be acquired using both the light attenuator 10 and the light detector 30 for the second light L2 of the second light-emitting device 42 used as the reference. The order of acquiring the first radiant flux and the second radiant flux is arbitrary.

Further, as shown in FIG. 2, the light detector 30 can acquire the third radiant flux of the first light L1 that is emitted from the first light-emitting device 41, passes through the photometric sphere 20, is reflected by the first surface 11, is reflected by the inner surface 25, and enters the light detector 30.

The first radiant flux is taken as E1; the second radiant flux is taken as E2; and the third radiant flux is taken as E3. The processor 35 can output the first value corresponding to E3×(E1/E2).

"E1/E2" is the correction coefficient for the third radiant flux (E3) detected by the light detector 30. Thus, the processor 35 can output the correction value of the radiant flux (the third radiant flux (E3)) for the first light-emitting device 41.

In the embodiment, the correction coefficient may be stored. As described above, for example, the memory 36 may be provided in the measurement device 110. The memory 36 may be configured to store a second value corresponding to "E1/E2" recited above. The second value that corresponds to "E1/E2" includes the value of "E1/E2." The processor 35 may be configured to output the first value based on the second value stored in the memory 36.

An example of the light attenuator 10 will now be described.

Figure 6:
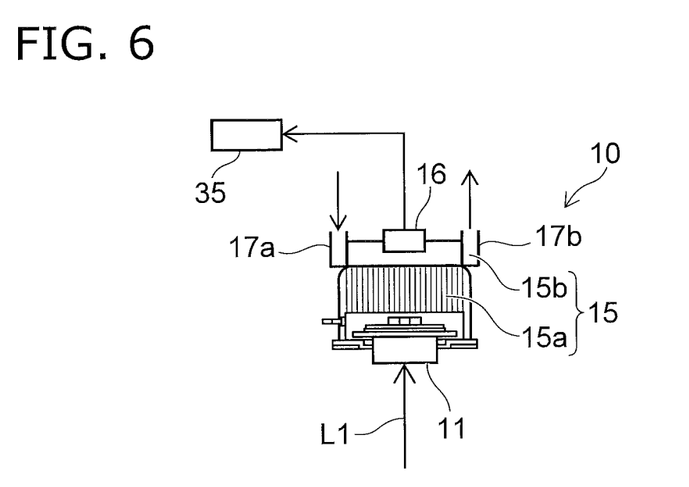
FIG. 6 is a schematic cross-sectional view illustrating a portion of the measurement device of the light-emitting device according to the first embodiment.

FIG. 6 is a schematic cross-sectional view illustrating a portion of the measurement device of the light-emitting device according to the first embodiment.

As shown in FIG. 6, the first surface 11 and the heat dissipator 15 are provided in the light attenuator 10. In the example, the light attenuator 10 includes a thermoelectric conversion portion 16. The heat dissipator 15 includes the heat dissipation fin 15a and the cooling portion 15b. The heat dissipation fin 15a is cooled by the cooling portion 15b. In the example, the heat dissipator 15 includes a liquid-cooling cooling portion 15b. A liquid flows into the cooling portion 15b via an inflow portion 17a. The liquid outflows from the cooling portion 15b via an outflow portion 17b. For example, the thermoelectric conversion portion 16 detects the difference between the temperature of the liquid flowing into the cooling portion 15b and the temperature of the liquid outflowing from the cooling portion 15b. The thermoelectric conversion portion 16 can output the temperature difference as an electrical signal. The radiant flux of the light incident on the first surface 11 can be measured based on the electrical signal. The output of the thermoelectric conversion portion 16 may be supplied to the processor 35. Various modifications of the configuration of the thermoelectric conversion portion 16 are possible in the embodiment.

For example, the first radiant flux recited above may be obtained based on the radiant flux detected using the thermoelectric conversion portion 16.

In the embodiment, a calorimeter may be used as the light attenuator 10. The quality of the calorimeter can be guaranteed to be maintained even when a high-power laser light is incident. The maintenance is easy because high durability is obtained. It is unnecessary to provide an optical element for attenuation other than the calorimeter and the photometric sphere 20. The measurement system can be downsized thereby. The safety is high because the light attenuator 10 is the terminal structure of the light from the light-emitting device.

In the embodiment, the first surface 11 includes, for example, NiP (nickel-phosphorus). The inner surface 25 of the photometric sphere 20 includes, for example, barium sulfate. The materials recited above are examples; and these materials are arbitrary in the embodiment.

Second Embodiment

A second embodiment relates to a method for measuring a light-emitting device.

Figure 7:
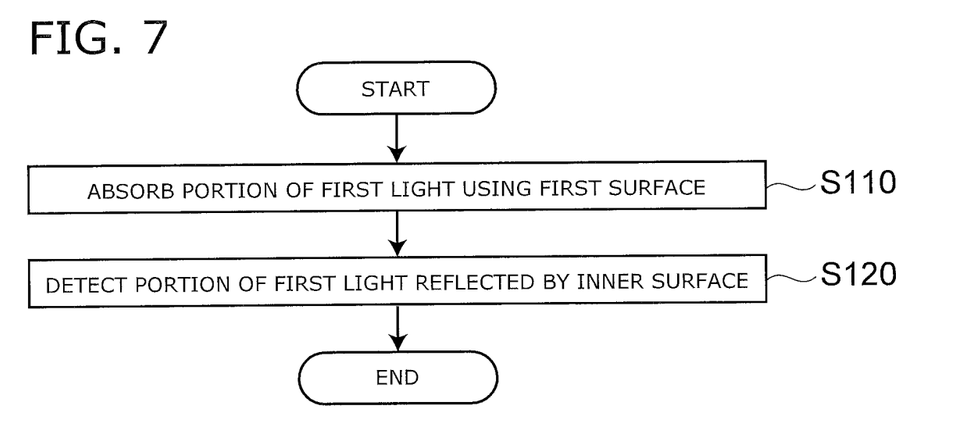
FIG. 7 is a flowchart illustrating a method for measuring a light-emitting device according to a second embodiment.

FIG. 7 is a flowchart illustrating the method for measuring the light-emitting device according to the second embodiment. In the method for measuring the light-emitting device according to the embodiment as shown in FIG. 7, the first light L1 that is emitted from the light-emitting device (e.g., the first light-emitting device 41) is caused to be incident on the first surface 11 of the light attenuator 10 to cause the first surface 11 to absorb a portion of the first light L1 (step S110). The light attenuator 10 includes the first surface 11 recited above, and the heat dissipator 15 dissipating the heat of the first surface 11 (referring to FIG. 1 and FIG. 2).

The photometric sphere 20 that has the inner surface 25 reflecting the first light L1 reflected by the first surface 11 (referring to FIGS. 1 and 2) is used in the measuring method. In the measuring method, at least a portion of the first light L1 reflected by the inner surface 25 is detected (step S120). For example, the detection is performed using the light detector 30 (referring to FIG. 1 and FIG. 2).

In the embodiment, a method for measuring a light-emitting device can be provided in which the measurement time can be shortened.

The measuring method according to the embodiment may include measuring using a correction coefficient.

For example, the light attenuator 10 acquires the first radiant flux of the first light L1 that is emitted from the first light-emitting device 41 at the first condition ST1 and is incident on the first surface 11 without passing through the photometric sphere 20 (referring to FIG. 3A). The light detector 30 acquires the second radiant flux of the first light L1 that is emitted from the first light-emitting device 41 at the first condition ST1, passes through the photometric sphere 20, is reflected by the first surface 11, is reflected by the inner surface 25, and enters the light detector 30 (referring to FIG. 3B). The light detector 30 acquires the third radiant flux of the first light L1 that is emitted from the first light-emitting device 41 at the second condition ST2 different from the first condition ST1, passes through the photometric sphere 20, is reflected by the first surface 11, is reflected by the inner surface 25, and enters the light detector 30 (referring to FIG. 3C). The first radiant flux is taken as E1; the second radiant flux is taken as E2; and the third radiant flux is taken as E3. The measuring method according to the embodiment may include outputting the first value corresponding to E3×(E1/E2).

The second condition ST2 recited above includes at least one of the second current (the magnitude of the current) recited below, the second current pulse width recited below, the second current pulse period recited below, or the second temperature recited below. The second current (the magnitude of the current) is different from the first current (the magnitude of the current) supplied to the first light-emitting device 41 at the first condition ST1. The second current pulse width (the time of the current pulse) is different from the first current pulse width supplied to the first light-emitting device 41 at the first condition ST1. The second current pulse period is different from the first current pulse period supplied to the first light-emitting device 41 at the first condition ST1. The second temperature is different from the first temperature of the first light-emitting device 41 at the first condition ST1.

The measuring method according to the embodiment may include measuring using a correction coefficient obtained using the second light-emitting device 42. For example, the light attenuator 10 acquires the first radiant flux of the second light L2 that is emitted from the second light-emitting device 42 and is incident on the first surface 11 without passing through the photometric sphere 20 (referring to FIG. 4). For example, the light detector 30 acquires the second radiant flux of the second light L2 that is emitted from the second light-emitting device 42, passes through the photometric sphere 20, is reflected by the first surface 11, is reflected by the inner surface 25, and enters the light detector 30 (referring to FIG. 5). The light detector 30 acquires the third radiant flux of the first light L1 that is emitted from the first light-emitting device 41, passes through the photometric sphere 20, is reflected by the first surface 11, is reflected by the inner surface 25, and enters the light detector 30 (referring to FIG. 2). The first radiant flux is taken as E1; the second radiant flux is taken as E2; and the third radiant flux is taken as E3. The measuring method according to the embodiment may include outputting the first value corresponding to E3×(E1/E2).

The memory 36 may store the second value corresponding to E1/E2 recited above. The measuring method according to the embodiment may include outputting the first value recited above based on the second value stored in the memory 36.

According to the embodiments, a measurement device of a light-emitting device and a method for measuring the light-emitting device can be provided in which the measurement time can be shortened.

Hereinabove, embodiments of the invention are described with reference to specific examples. However, the invention is not limited to these specific examples. For example, one skilled in the art may similarly practice the invention by appropriately selecting specific configurations included in the measurement device such as the light attenuator, the photometric sphere, the light detector, etc., from known art; and such practice is within the scope of the invention to the extent that similar effects can be obtained.

Any two or more components of the specific examples can be combined within the extent of technical feasibility and are within the scope of the invention to the extent that the spirit of the invention is included.

Moreover, all measurement devices of light-emitting devices and methods for measuring the light-emitting devices practicable by an appropriate design modification by one skilled in the art based on the measurement devices of the light-emitting devices and the methods for measuring the light-emitting devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A measurement device for a light-emitting device, comprising:
   a light attenuator comprising:
      a first surface on which a first light emitted from a first light-emitting device is incident and which is configured to absorb a portion of the first light; and
      a heat dissipator configured to dissipate heat of the first surface;
   a photometric sphere having an inner surface to reflect the first light reflected by the first surface; and
   a light detector configured to receive at least a portion of the first light reflected by the inner surface,
   the heat dissipator physically contacting the first surface and not contacting the photometric sphere.

2. The measurement device according to claim 1, wherein the photometric sphere has a first opening through which the first light emitted from the first light-emitting device enters and a second opening to which the first light initially arrives after passing through the first opening.

3. The measurement device according to claim 1, wherein the photometric sphere has a first opening and a second opening, and
   the second opening is provided between the first opening and the first surface in a first direction, the first direction being from the first opening toward the first surface.

4. The measurement device according to claim 3, wherein the first light emitted from the first light-emitting device passes through the second opening and is incident on the first surface.

5. The measurement device according to claim 3, wherein the photometric sphere further has a third opening,
   a second direction from the second opening toward the third opening is non-parallel to the first direction, and
   the third opening is positioned between a center of the photometric sphere and the first opening in the first direction.

6. The measurement device according to claim 5, wherein the light detector receives the at least a portion of the first light passing through the third opening after being reflected by the inner surface of the photometric sphere.

7. The measurement device according to claim 1, wherein the heat dissipator includes a heat dissipation fin, and a cooling portion cooling the heat dissipation fin, the cooling portion being air-cooling or liquid-cooling.

8. The measurement device according to claim 1, wherein a reflectance of the first surface for the first light is 35% or less.

9. A measurement device for a light-emitting device, comprising:
   a light attenuator comprising:
      a first surface on which a first light emitted from a first light-emitting device is incident and which is configured to absorb a portion of the first light; and
      a heat dissipator configured to dissipate heat of the first surface;
   a photometric sphere having an inner surface to reflect the first light reflected by the first surface;
   a light detector configured to receive at least a portion of the first light reflected by the inner surface; and
   a processor configured to:
      acquire, from the light attenuator, a first radiant flux of the first light emitted from the first light emitting device at a first condition to be incident on the first surface without passing through the photometric sphere,
      acquire, from the light detector, a second radiant flux of the first light emitted from the first light-emitting device at the first condition to enter the light detector after passing through the photometric sphere, being reflected by the first surface, and being reflected by the inner surface,
      acquire, from a light detector, a third radiant flux of the first light emitted from the first light-emitting device at a second condition different from the first condition to enter the light detector after passing through the photometric sphere, being reflected by the first surface, and being reflected by the inner surface, and calculate a first value corresponding to E3×(E1/E2), wherein E1 is the first radiant flux, E2 is the second radiant flux, and E3 is the third radiant flux.

10. The measurement device according to claim 9, wherein the second condition includes at least one of:

a second current different from a first current, the first current being supplied to the first light-emitting device at the first condition, the second current being supplied to the first light-emitting device at the second condition;

a second current pulse width different from a first current pulse width, the first current pulse width being supplied to the first light-emitting device at the first condition, the second current pulse width being supplied to the first light-emitting device at the second condition;

a second current pulse period different from a first current pulse period, the first current pulse period being supplied to the first light-emitting device at the first condition, the second current pulse period being supplied to the first light-emitting device at the second condition; or a second temperature different from a first temperature, the first light-emitting device having the first temperature at the first condition, the first light-emitting device having the second temperature at the second condition.

11. The measurement device according to claim 9, further comprising memory configured to store a second value corresponding to E1/E2, the processor is configured to calculate the first value based on the second value stored in the memory.

12. The measurement device according to claim 1, wherein the light attenuator includes a thermoelectric conversion portion.

13. The measurement device according to claim 1, wherein a radiant flux of the first light emitted from the first light-emitting device is not less than 0.1 W and not more than 120 kW.

14. The measurement device according to claim 1, wherein the first light emitted from the first light-emitting device is a laser.

15. The measurement device according to claim 1, wherein the light attenuator is a calorimeter.

16. A method for measuring a light-emitting device, comprising:

controlling a first light-emitting device to emit a first light to be incident on a first surface of a light attenuator to cause the first surface to absorb a portion of the first light, the light attenuator including the first surface and a heat dissipator dissipating heat of the first surface; and detecting at least a portion of the first light reflected by an inner surface of a photometric sphere after being reflected by the first surface, the heat dissipator physically contacting the first surface and not contacting the photometric sphere.

17. A method for measuring a light-emitting device, comprising:

controlling a first light-emitting device to emit a first light to be incident on a first surface of a light attenuator to cause the first surface to absorb a portion of the first light, the light attenuator including the first surface and a heat dissipator dissipating heat of the first surface;

detecting at least a portion of the first light reflected by an inner surface of a photometric sphere after being reflected by the first surface;

acquiring, using the light attenuator, a first radiant flux of the first light emitted from the first light-emitting device at a first condition to be incident on the first surface without passing through the photometric sphere;

acquiring, using the light detector, a second radiant flux of the first light emitted from the first light-emitting device at the first condition to enter the light detector after passing through the photometric sphere, being reflected by the first surface, and being reflected by the inner surface;

acquiring, using the light detector, a third radiant flux of the first light emitted from the first light-emitting device at a second condition different from the first condition to enter the light detector after passing through the photometric sphere, being reflected by the first surface, and being reflected by the inner surface; and calculating a first value corresponding to E3×(E1/E2), wherein E1 is the first radiant flux, E2 is the second radiant flux, and E3 is the third radiant flux.

18. The method according to claim 17, wherein the second condition includes at least one of:

a second current different from a first current, the first current being supplied to the first light-emitting device at the first condition, the second current being supplied to the first light-emitting device at the second condition;

a second current pulse width different from a first current pulse width, the first current pulse width being supplied to the first light-emitting device at the first condition, the second current pulse width being supplied to the first light-emitting device at the second condition;

a second current pulse period different from a first current pulse period, the first current pulse period being supplied to the first light-emitting device at the first condition, the second current pulse period being supplied to the first light-emitting device at the second condition; or a second temperature different from a first temperature, the first light-emitting device having the first temperature at the first condition, the first light-emitting device having the second temperature at the second condition.

19. The method according to claim 17, further comprising:

storing a second value corresponding to E1/E2 in a memory; and calculating the first value based on the second value stored in the memory.

20. The measurement device according to claim 1, further comprising:

a support, wherein the light attenuator and the photometric sphere are mounted on the support such that a relative positional relationship between the light attenuator and the photometric sphere is modifiable.

* * * * *